United States Patent [19]

Whitley, Jr. et al.

[11] Patent Number: 4,699,606
[45] Date of Patent: Oct. 13, 1987

[54] APPARATUS FOR DETECTING AND/OR CONTROLLING TENSION OF A MOVING WEB, FOR EXAMPLE, A FILAMENTARY TOW UTILIZED IN THE PRODUCTION OF CIGARETTE FILTERS

[75] Inventors: Cornell Whitley, Jr., Charlotte; William L. Millen, Pineville; George C. Trail, Jr., Matthews, all of N.C.

[73] Assignee: Celanese Corporation, New York, N.Y.

[21] Appl. No.: 897,683

[22] Filed: Aug. 18, 1986

[51] Int. Cl.$^4$ .......................... A24D 3/02; G01L 5/06; G01L 5/10
[52] U.S. Cl. .......................................... 493/4; 493/24; 493/37; 493/42; 226/45; 226/108; 73/862.48
[58] Field of Search .......................... 226/44, 45, 108; 73/862–848; 493/4, 24, 29, 37, 42, 44

[56] References Cited

U.S. PATENT DOCUMENTS

| | | | |
|---|---|---|---|
| 2,790,208 | 4/1957 | Smith | 19/66 R |
| 2,926,392 | 3/1960 | Jackson | 19/66 R |
| 3,031,152 | 4/1962 | Cohen et al. | 73/862.48 |
| 3,032,245 | 5/1962 | George et al. | 226/39 |
| 3,099,594 | 7/1963 | Caines et al. | 156/152 |
| 3,112,052 | 11/1963 | Johnson | 226/42 |
| 3,376,740 | 4/1968 | Harvey | 73/862.48 |
| 3,589,181 | 6/1971 | Palmatier et al. | 73/862.48 |
| 3,602,866 | 8/1971 | Saxl | 73/862.48 |
| 3,852,007 | 12/1974 | Levers et al. | 425/66 |
| 3,960,645 | 6/1976 | Brackmann et al. | 156/441 |
| 4,036,622 | 7/1977 | Carroll et al. | 65/3.1 |
| 4,233,837 | 11/1980 | Canfield | 73/862.48 |
| 4,326,424 | 4/1982 | Koenig | 73/862.48 |
| 4,383,631 | 5/1983 | Fairchild | 226/186 |
| 4,522,616 | 6/1985 | Hyde et al. | 493/44 |
| 4,561,580 | 12/1985 | Trail, Jr. | 226/45 |

Primary Examiner—Robert P. Olszewski
Assistant Examiner—William E. Terrell
Attorney, Agent, or Firm—Forrest D. Stine

[57] ABSTRACT

Apparatus for detecting and/or controlling tension of a moving web, for example, a filamentary tow, in a preselected zone of a longitudinal path traversed by the moving web. A sensing roller is journally supported by roller support structure, the latter having an opposing pair of deflection arms each of which is defined by edges which diverge from one another between inner supported and outer unsupported ends of the arms so that a region of reduced width (as measured in the general longitudinal direction of the web) is provided near each inner supported end. A reaction force which is indicative of the web's tension will thus be exerted against the sensing roller and transferred to the roller support structure so as to responsively cause the deflection arms to be resiliently flexed in the general direction of the reaction force. The extent of such resilient flexion is detected with strain gauges operatively connected to the deflection arms and output a signal indicative of the web's tension to provide monitoring and/or control thereof.

16 Claims, 5 Drawing Figures

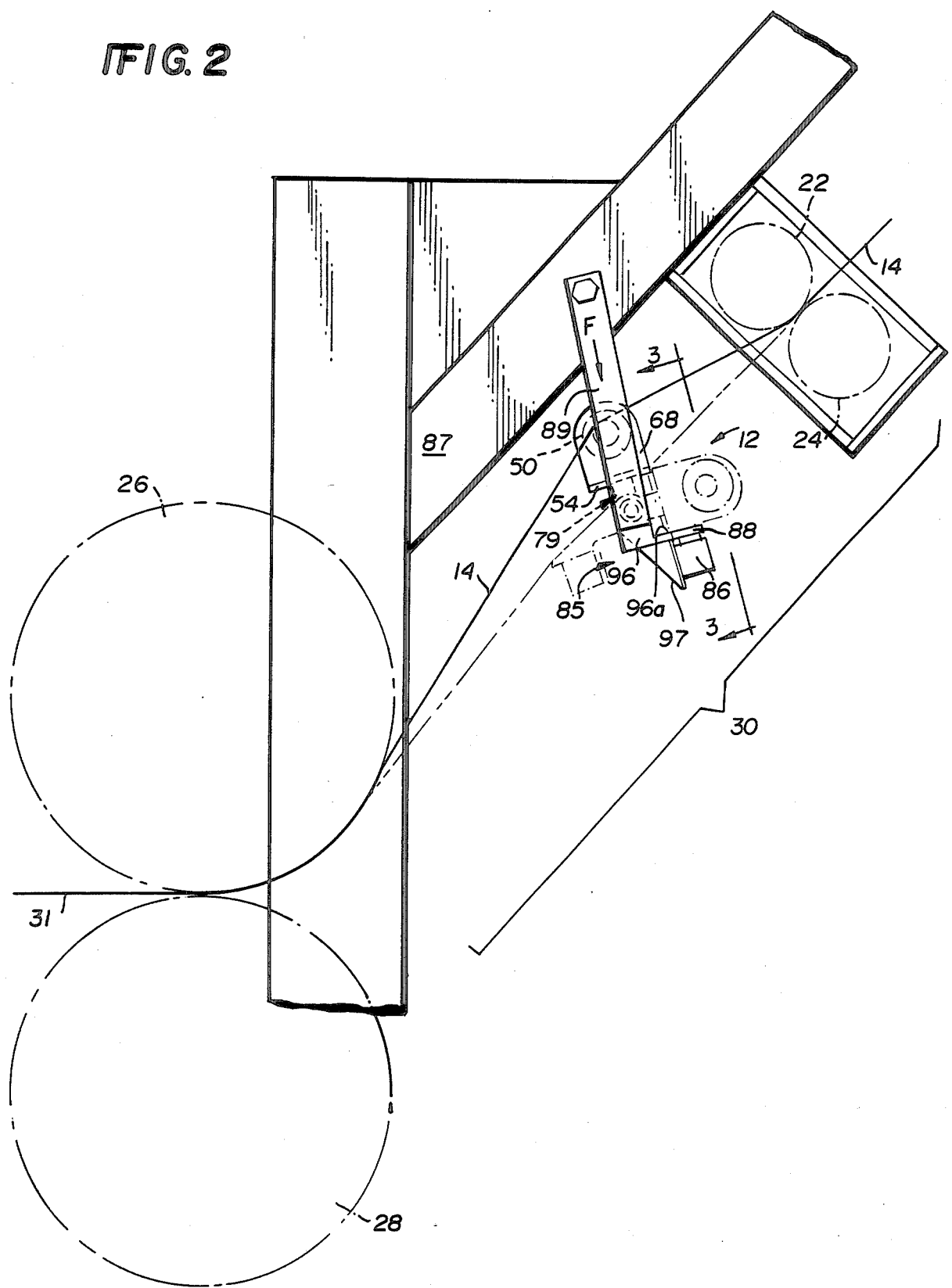

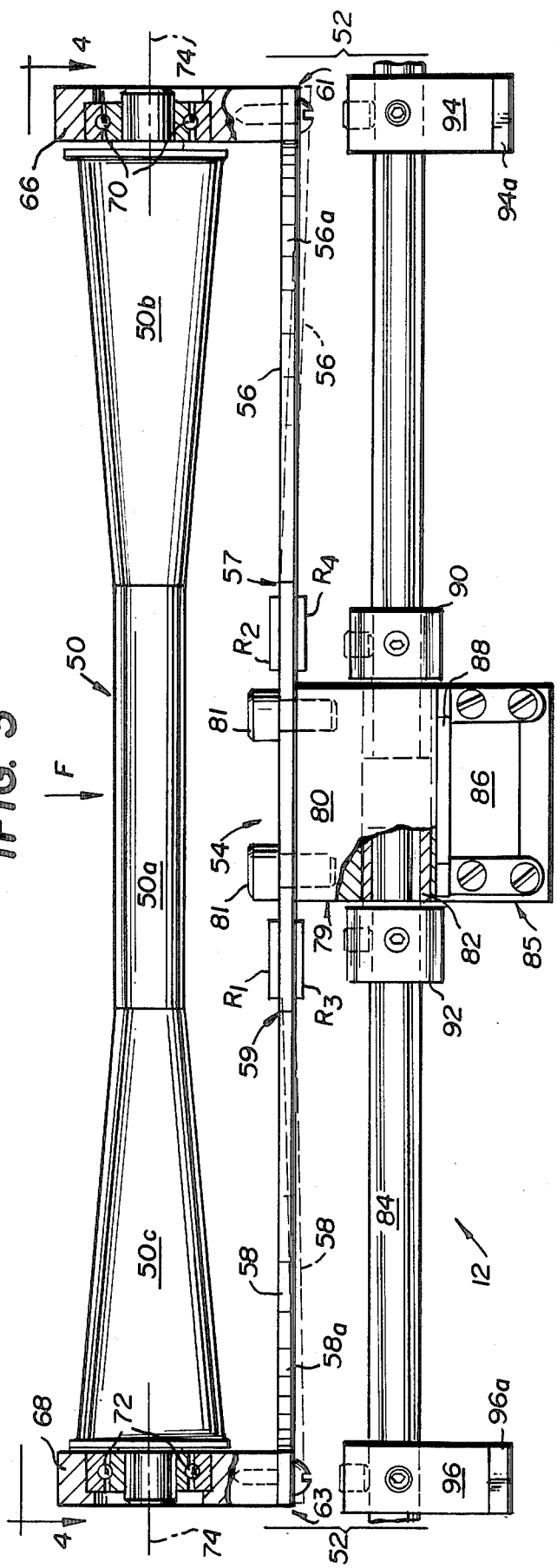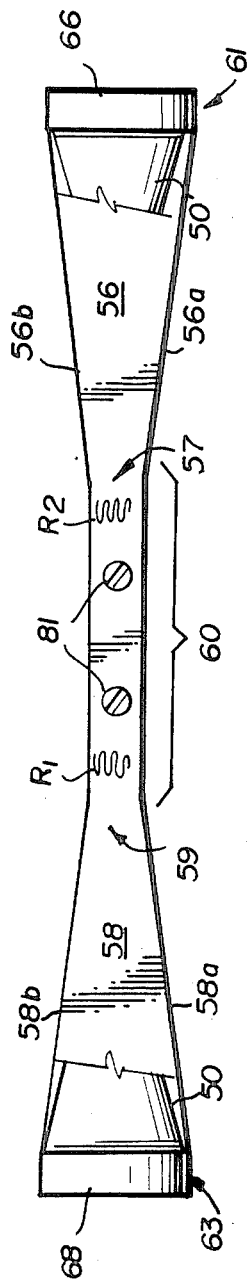

APPARATUS FOR DETECTING AND/OR CONTROLLING TENSION OF A MOVING WEB, FOR EXAMPLE, A FILAMENTARY TOW UTILIZED IN THE PRODUCTION OF CIGARETTE FILTERS

FIELD OF INVENTION

The present invention relates to the field of tension detecting and/or controlling apparatus. More particularly, the invention herein described and claimed relates to apparatus which detect and/or control tension of a moving web, for example, a filamentary tow utilized in the production of cigarette filters.

BACKGROUND OF THE INVENTION

Cigarette filters have conventionally been produced from longitudinally extended crimped filaments bonded to one another at their contact points by solvation bonds. The procedure for producing such filters involves producing a tow (or several thousand continuous filaments), crimping the tow, opening the tow to deregister adjacent crimps, uniformly applying a plasticizer to the opened tow, fluffing the tow, and thereafter condensing the plasticized tow to reduce its cross-sectional size until it is approximately equal to the cross-sectional size of a cigarette. The condensed mass is formed into a coherent structure, typically by wrapping paper around it and severing the wrapped tow into rods of predetermined length. The rods are thereafter cured to effect bonding between adjacent filaments at their contact points.

Because of the expense of the tow component of cigarette filters, it is desirable that the greatest amount of tow bulk be attained per unit weight of filamentary material. One method of expanding the tow in which the present invention is particularly well suited for use is described in U.S. Pat. No. 3,099,594 (the entire disclosure thereof being expressly incorporated hereinto by reference) wherein crimped continuous tow is fed into a jet supplied with high velocity gas whereby the crimps in the filaments are deregistered. More specifically, in the process of U.S. Pat. No. 3,099,594, a continuous multifilament crimped tow is withdrawn from a supply bale by means of a feed roll pair and passed by the suction of a blooming jet over a suitable plasticizer applicator into the blooming jet. In the blooming jet, the tow is subjected to an explosive expansion of compressed air so as to cause blooming or fluffing of the tow. The bloomed tow is then expelled from the jet under the influence of the expanding air flow into a filter rod-making machine whereby the tow is condensed into rod-like form as previously discussed.

The tow is also sometimes subjected to longitudinal tension upstream of the blooming jet according to the methods disclosed in, for example, U.S. Pat. Nos. 2,790,208 and 2,926,392, which are each incorporated hereinto by reference. According to the methods described in these patents, the longitudinally moving tow is generally subjected to continuous longitudinal tension in a zone established between a pair of tension rolls and a pair of retarded rolls (sometimes called "feed rolls" and "pretension rolls", respectively, in art parlance). The feed rolls are driven at a speed greater than the pretension rolls so that the tow is subjected in the zone therebetween to continuous longitudinal tension. Upon emerging on the downstream side of the feed rolls, the applied tension is suddenly released to thereby allow the crimped tow to relax. Such applied tension and then sudden relaxation assist in opening the tow prior to treatment by the blooming jet.

However, the tension applied in the tension zone by means of the feed and pretension roll pairs may not be uniform once an operator has set the tension in the zone for a given tow product. Such nonuniformity of applied tension may therefore be manifested in variability of the resulting filter rod characteristics, for example, pressure drop per unit rod weight, from one rod to another thereby leading to a nonuniform filter rod product.

SUMMARY OF THE PRESENT INVENTION

It is one object of the present invention to provide apparatus for detecting the tension of a moving filamentary tow so that variations in the tension thereof may be monitored and/or controlled so as to reduce rod-to-rod variabilities, such as pressure drop variabilities per unit rod weight. A further object of this invention is to provide apparatus which can be moved into and out of contact with the moving filamentary tow so that the tension of the tow can either be periodically detected at preselected intervals or continuously detected during processing of the tow into cigarette filter rods.

These and other objects (which will become more clear to the reader after consideration of the detailed description thereof which follows) are achieved by means of apparatus having a sensing roller which is rotatable about its central axis and a roller support which supports the sensing roller in a generally transverse relationship to a longitudinal path traversed by a moving web or tow. The tow thus contacts the sensing roller and exerts a force thereagainst which is indicative of the tension of the tow. The roller support includes an elongate bottom support plate disposed parallel to the central axis of the sensing roller and thus is also positioned transverse to the tow's longitudinal path. The bottom support plate includes a central region and a pair of opposing arms each having an inner end (preferably integrally joined to the central region) and an outer, unsupported end spaced from the inner end in a transverse direction relative to the tow's longitudinal path. Each of the arms have an opposing pair of sides which outwardly diverge from one another along the transverse direction between the inner and outer ends such that a reduced width dimension is present near the inner end of each arm as compared to a width dimension near the outer end thereof.

A pair of spaced-apart journal supports are fixed to and upstandingly extend from respective ones of the outer, unsupported ends of the support arms so as to journally mount the sensing roller therebetween for rotational movement about its central axis. The journal supports also transfer the force exerted upon the sensing roller to the unsupported ends of the bottom support plate. Such transferred force thereby causes the arms to be resiliently flexed in the direction of the transferred force and the extent of flexion is detected by suitable means which, in a preferred embodiment, is comprised of strain gauges connected in a Wheatstone Bridge arrangement. The output from the strain gauges can thus be coupled to monitoring equipment and/or utilized to regulate the longitudinal tension applied to the tow.

BRIEF DESCRIPTION OF THE ACCOMPANYING DRAWING

Reference will hereinafter be made to the accompanying drawings wherein like reference numerals throughout the various Figures denote like structural elements, and wherein;

FIG. 2 is a side elevational view of the tension detecting device of the present invention shown positioned between pretension and feed rolls of the apparatus depicted in FIG. 1;

FIG. 3 is a rear elevational view of the tension detecting device of the present invention taken along line 3—3 in FIG. 2;

FIG. 4 is a top plan view showing the sensing roller partially sectioned taken along line 4—4 in FIG. 3.

DETAILED DESCRIPTION OF THE PREFERRED EXEMPLARY EMBODIMENTS

Figure 1:
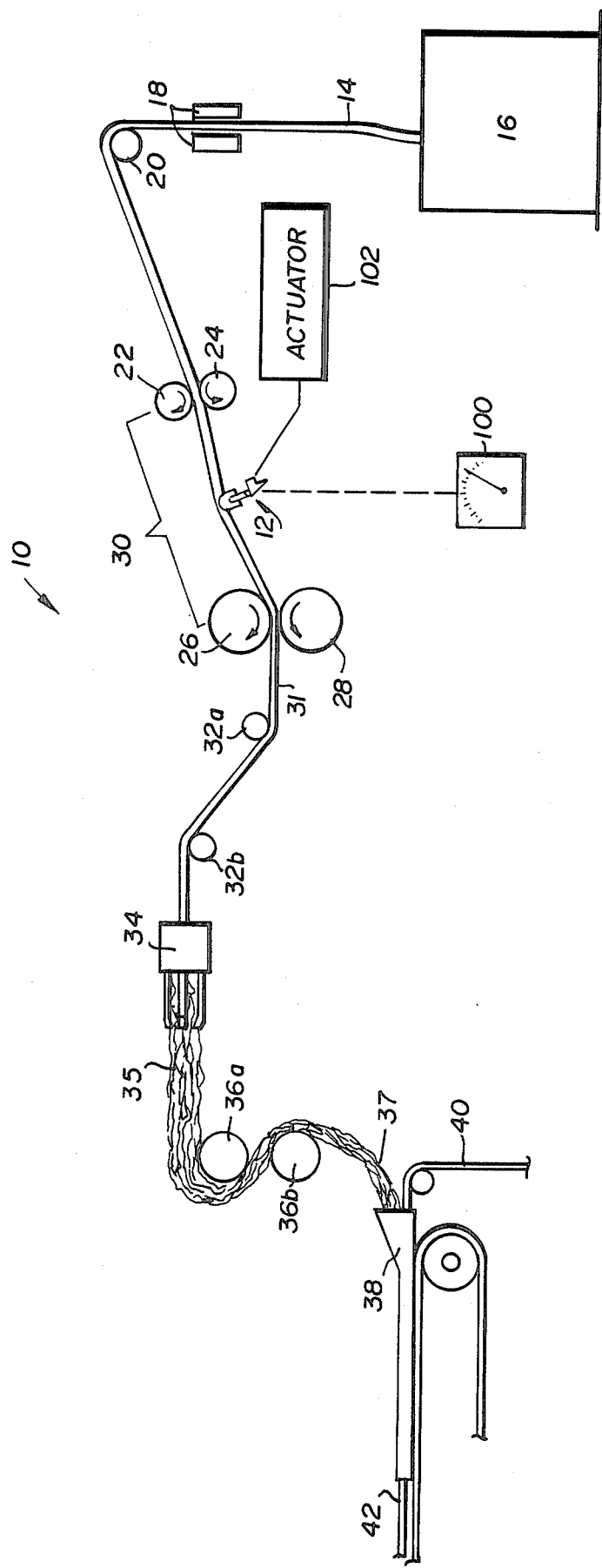
FIG. 1 is a schematic representation of a cigarette filter rod making apparatus in which the tension detecting device of the present invention is particularly well suited for use.

A cigarette filter rod making apparatus 10 with which the tension detecting device 12 of this invention is particularly well suited for use is shown schematically in accompanying FIG. 1. As can be seen, a filamentary tow 14 is removed from a supply bale 16 and passes through a pneumatic banding jet 18 which initially spreads the tow laterally to thereby provide preliminary opening of the tow. The tow 14 then passes over idler roll 20 and is directed to the nip formed between pretension roll pair 22, 24. Driven feed roll pair 26, 28 is located downstream of pretension roll pair 22, 24. A tensioning zone 30 is defined between pretension and feed roll pairs 22, 24 and 26, 28, respectively. Longitudinal tension is thus applied to the tow band 14 in zone 30 by means of pretension roll pair 22, 24 and feed roll pair 26, 28, for example, in accordance with the techniques disclosed in U.S. Pat. Nos. 2,797,208 and 2,926,392. The longitudinal tension applied in zone 30 is suddenly released immediately downstream of feed roll pair 26, 28 so as to assist in the partial opening and deregistration of crimps in the tow band 14. The thus partially opened tow band (now designated by numeral 31) is then passed over plasticizer wick applicators 32a, 32b which together uniformly apply a plasticizing liquid onto the tow band 31. The plasticized and partially opened tow 31 is then fed into a blooming jet 34 so as to significantly fluff or completely bloom the tow 31 by means of a pressurized fluid, e.g., air. The flow air exiting blooming jet 34 feeds the bloomed tow (now designated by numeral 35) between a pair of delivery rolls 36a, 36b which serve to preliminarily compact the tow into rope-like form and control the delivery of the preliminarily compacted tow (now designated by reference numeral 37) to garniture 38 where further compacting of the tow 37 occurs. A srapping paper 40 is also concurrently fed into garniture 38 so that as the tow 37 is further compacted into rod-like shape by means of garniture 38, paper 40 will be wrapped therearound to produce cigarette rod element 42. Rod element 42 may then be cut by means not shown into convenient lengths for attachment to a tobacco column.

As seen in FIGS. 2–4 the tension detecting device 12 of this invention generally includes a sensing roller 50 supported by roller support structure 52 (see FIG. 3) so that the sensing roller 50 contacts the tow band 14 in zone 30. The roller support structure 52 includes a planar bottom support plate 54 having a pair of deflection arms 56, 58 integrally joined to one another at their respective inner ends 57, 59 to form a central region 60 (see FIG. 4). As shown in FIG. 4, each deflection arm 56 and 58 has leading and trailing edges 56a, 56b and 58a, 58b, respectively, which outwardly diverge from one another between the inner ends 57, 59 and the outer, unsupported ends 61, 63, respectively. Thus, the width dimension of each arm 56 and 58 (as measured in the longitudinal direction of tow movement) is less at the inner ends 57, 59 as compared to the width dimension of arms 56, 58 at their respective outer, unsupported ends 61, 63. Moreover, the width dimension of central region 60 is similarly of a reduced width dimension as compared to the width dimension of the outer ends 61, 63. As exemplary dimensions, support plate 54 may be 10 inches long (as measured transverse to the longitudinal direction of tow movement) with central region 60 and outer ends 61, 63 being ½ inch and 1⅜ inches wide, respectively.

The outer ends 61, 63 of deflection arms 56, 58, include journal support members 66, 68, respectively. Journal support members 66, 68 are provided with bearings 70, 72, respectively, so as to mount sensing roller 50 for rotational movement about its central axis 74.

The central region 60 of support plate 54 is rigidly coupled to an upper end 79 of support post 80 by means of bolts 81 as may be seen more clearly in FIG. 3. Support post 80 includes a sleeve 82 which is slideably coupled to transverse support 84, the latter being dependently supported from frame 87 (see FIG. 2) of apparatus 10 by means of a bracket member 89 fixed to each end of rod 84. Sleeve 82 permits pivotal movements of the support post 80 (and thus the sensing roller 50) between an operative position wherein the sensing roller 50 is in sensing contact with the tow band 14 (as shown in solid line in FIG. 2) and an inoperative position wherein the sensing roller 50 is spaced from the tow band 14 (as shown in phantom line in FIG. 3).

The tail end 85 of support post 80 carries a magnet latch member 86 which contacts strike plate 88 when the support post 80 is in its operative position thereby to maintain the sensing roller 50 in operative sensing contact with tow band 14. A pair of lateral stops 90, 92 are provided on each side of sleeve 82 so as to prevent lateral slippage and/or displacement of support post 80 upon transverse support rod 84. Additionally, a pair of stop members 94, 96 having limit flanges 94a, 96a, respectively, are provided so as to be in registry with unsupported ends 61, 63 so that the unsupported ends 61, 63 will bear against flanges 94a, 96a when support post 80 is in its inoperative position. Flanges 94a, 96a thereby establish the inoperative position of support post 80. Tail end 85 of support post 80 also defines a smooth, preferably planar, surface 97 so that tow band 14 may slide therealong without substantial drag being imparted thereto when support post 80 is in the inoperative position (see phantom line showing thereof in FIG. 2).

Figure 5:
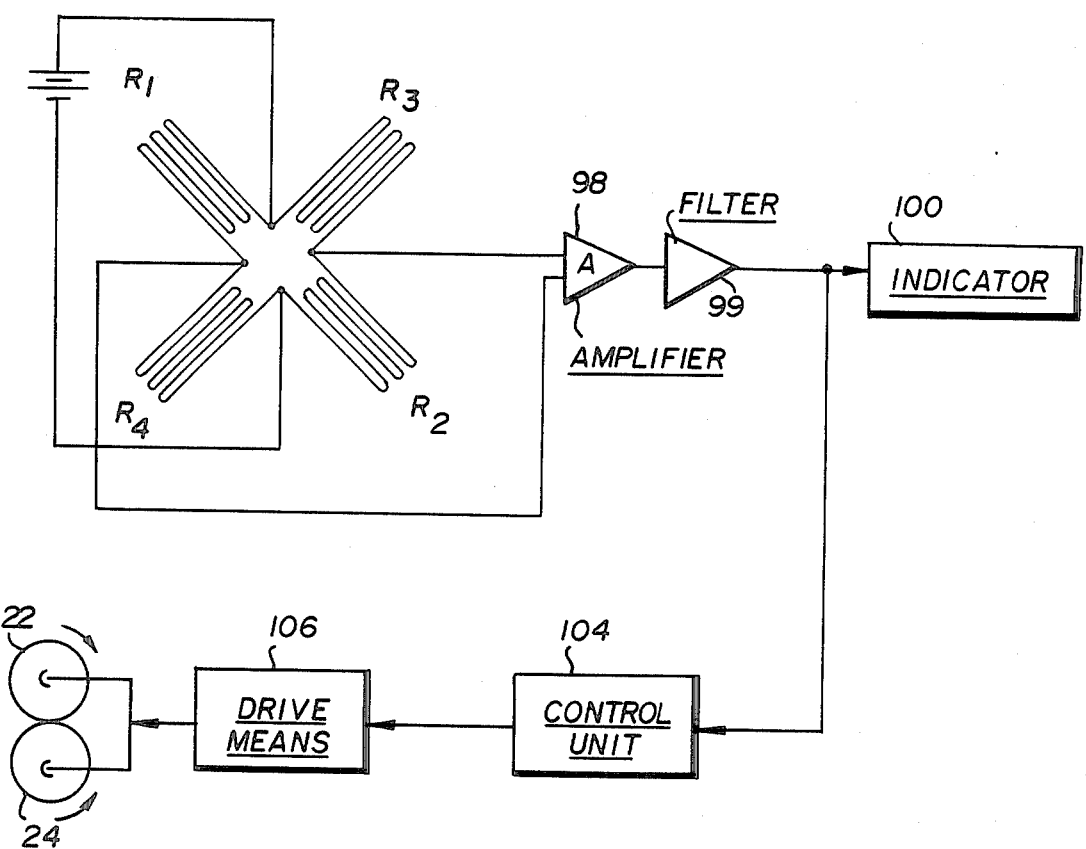
FIG. 5 is an electrical circuit which may be employed to transfer output signals from the strain gauges to an indicator and/or tow tension control means.

Paired strain gauges $R_1$–$R_4$ are operatively bonded to respective upper and lower surfaces of central region 60 of bottom support plate 54 laterally of center support post 80 as is schematically shown in FIG. 3. Strain gauges $R_1$-$R_4$ are of the conventional type, for example, Model No. CEA-13-250UW-350 available from the Micro-Measurements Division, Measurements Group, Inc. of Raleigh, N.C., and are connected to one another in a Wheatstone Bridge arrangement as shown in FIG. 5. As is seen therein, the outputs of the strain gauges $R_1$-$R_4$ of the bridge are fed into, for example, an amplifier 98 of conventional construction so as to amplify the output signals, for example, in the range of 0-5 volts which is proportional to the sensed tension of tow 14. The amplified output signal is then filtered by filter 99 to remove "noise" therefrom, such as machine vibrations. The thus filtered signal may then be sent to a suitable indicator 100 (see FIG. 1) to provide a human-readable indication of the tension of tow band 14 in zone 30.

The filtered signal emanating from filter 99 may, alternately or concurrently, be utilized to control the tension of tow 14 within zone 30. For example, the signal may be fed into control unit 104 (see FIG. 5) which determines whether or not the tension of tow 14 in zone 30 is greater than or less than a tension setpoint. If a high or low tension limit is determined, control unit 104 will then issue a command signal to drive means 106 which is operatively coupled to pretension rolls 22, 24 so as to cause pretension rolls 22, 24 to either drive at greater or lesser rotational speed to respectively cause the tension of tow 14 in zone 30 to decrease or increase until the tension setpoint is again achieved. Drive means 106 may also take the form of an electric or pneumatic actuator which displaces one of the pretension rolls 22, 24 relative to the other to adjust the nip pressure exerted thereby upon tow 14 thus selectively varying the tension of tow 14 in zone 30.

In operation, the tension detecting apparatus 12 of this invention is pivoted into its operative position either manually or via suitable electronic or pneumatic actuator noted generally in FIG. 1 by reference numeral 102. While in the operative position, the tow band 14 will be deflected upwardly so that a force "F" (see FIGS. 2 and 3) which is indicative of the tension of tow band 14, will be exerted against sensing roller 50. Force "F" will then be transferred via journal supports 66, 68 to the outer, unsupported ends 61, 63 of amrs 56, 58, respectively. The force transferred to the outer, unsupported ends 61, 63 will thus downwardly displace (i.e., in the direction of force "F") the ends 61, 63 which, in turn, causes the bottom support plate 54 to be downwardly bowed or flexed laterally of support post 80 as is schematically shown by dashed line in FIG. 3. Owing to the reduced width of central region 60 near inner ends 57, 59 of arms 56, 58, respectively, the resilient flexion of bottom support 54 will be more pronounced thereat so as to facilitate detection of the extent of flexion by means of strain gauges $R_1$-$R_4$. Variations of the tension of tow band 14 in zone 30 will thus be manifested by variations of magnitude of force "F" which will, in turn, be detected by strain gauges $R_1$-$R_4$ as previously described and converted to human-readable form by means of indicator 100, and/or utilized to selectively control the speed of pretension rolls 22, 24, and thus the tension of tow 14 in zone 30, for example.

As may be appreciated, since flexion of both arms 56, 58 is being detected by strain gauges $R_1$-$R_4$, the apparatus 12 is insensitive to the location of tow band 14 along sensing roller 50. That is, should the tow shift laterally along roller 50, towards, for example, journal support 66, deflection arm 58 associated with the other journal support 68 will be downwardly flexed to a lesser extent than deflection arm 56 associated with journal support 66. Deflection arm 56 associated with journal support 66 will however be downwardly flexed to a correspondingly greater degree as compared to arm 58. The output signals emanating from the Wheatstone Bridge arrangement of strain gauges $R_1$-$R_4$ (see FIG. 5) will thus not exhibit a net decrease or increase in the extent of flexion of bottom support 54.

The shape of sensing roller 50 however is such that lateral tow shifting therealong is minimized. As seen in FIG. 3, sensing roller 50 has generally a concave shape defined by means of a central cylindrical portion 50a and laterally opposing truncated cone portions 50b, 50c each having their truncated apex joined to central portion 50a. Thus, should tow band 14 laterally shift away from central portion 50a, the laterally divergent cone portions 50b or 50c will urge the tow band 14 back towards central portion 50a. The particular generally concave shape of sensing roller 50 and the "balanced" arrangement of strain gauges $R_1$-$R_4$ thereby ensures that the output signals issuing therefrom will be substantially free from deviations which may otherwise occur should tow band 14 shift laterally upon roller 50.

While the present invention has been herein described in what is presently conceived to be the most preferred embodiment thereof, those in this art may recognize that many modifications may be made thereto, which modifications shall be accorded the broadest scope of the appended claims so as to encompass all equivalent apparatus, devices or structures.

What is claimed is:

1. Apparatus for detecting tension of a moving web, for example, a filamentary tow, in a preselected zone of a longitudinal path traversed by the moving web, said apparatus comprising:

a sensing roller which is rotatable about a central axis thereof;

roller support means connected to said sensing roller for supporting said sensing roller in said preselected zone such that said central axis of said sensing roller is generally transverse to said longitudinal path and such that said moving web contacts said sensing roller and exerts a force thereagainst which is indicative of the tension of the web in said zone, said roller support means including, (a) a center support member;

(b) an elongate bottom support plate disposed generally transverse to said longitudinal path of the moving web and thus parallel to said central axis, said bottom support plate having (i) a central region rigidly connected to said center support member thereby rigidly supporting said bottom support plate thererat, (ii) a pair of opposing arms each having an inner end integrally joined to said central region and an outer unsupported end laterally spaced from said inner end relative to the longitudinal path of said moving web, each of said arms having an opposing pair of edges which outwardly diverge from one another between said inner and outer ends such that a width dimension of each said arm, as measured in the general direction of the longitudinal path of said moving web, is reduced near said inner end as compared to a width dimension of each said arm near said outer unsupported end thereof, and said roller support means further including, (c) a pair of laterally spaced-apart journal support means, each said journal support means being upstandingly fixed to a respective one of said outer unsupported ends of said arms for journally supporting said sensing roller for rotational movement about said central axis thereof and for transferring said force exerted against said sensing roller to said pair of arms of said bottom support plate, and wherein (d) said reduced width dimension near said inner ends of said arms constitutes means which facilitates resilient flexion of said central region and/or said pair of arms in response to said force being transferred thereto by said journal support means, said apparatus further comprising:

strain gauge means operatively coupled to said bottom support plate for detecting an extent of said resilient flexion of said central region and/or said pair of arms and for translating said extent of resilient flexion into a signal representative of the tension of said moving web, whereby tension of said moving web in said preselected zone is detected.

2. Apparatus as in claim 1 wherein said center support member includes a support post having upper and lower ends and is rigidly connected at said upper end thereof to said central region of said bottom support plate, said support post also having means, located intermediate said upper and lower ends, for mounting said support post for pivotal movements between an inoperative position wherein said sensing roller is spaced from said moving web, and an operative position wherein said moving web is in contact with said sensing roller to thereby exert said force thereagainst.

3. Apparatus as in claim 2 wherein said roller support means includes actuator means for pivotally moving said support post, and thus said sensing roller, between said inoperative and operative positions.

4. Apparatus as in claim 2 wherein said roller support means further includes latch means for releasably holding said support post, and thus said sensing roller, in said operative position.

5. Apparatus as in claim 4 wherein said latch means includes a fixed-position strike plate, and a magnet latch carried by said lower end of said support post so that said magnet latch contacts said strike plate when said support post is in said operative position to releasably hold said support post thereat, and is separated from said strike plate when said support post is in said inoperative position.

6. Apparatus for detecting tension of a moving web, for example, a filamentary tow, said apparatus comprising a sensing roller, and roller support means adapted for supporting said sensing roller generally transverse to a longitudinal path of the moving web such that the web contacts the sensing roller and exerts a reaction force thereagainst in a generally downward direction relative to the movement of said web along said longitudinal path, said reaction force being indicative of the tension of the web, said roller support means including:

a center support post;

a bottom support plate which includes a pair of planar deflection arms each rigidly supported at an inner end thereof by means of said center support post and having an unsupported outer end laterally spaced from said supported inner end thereof relative to the longitudinal path of the web, each said deflection arm between said inner and outer ends being defined by (i) leading and trailing edges, relative to the general direction of movement of said web along said longitudinal path, and (ii) planar upper and lower surfaces being joined to said leading and trailing edges and extending from said center support post oppositely relative to the upper and lower surfaces of the other said deflection arm yet parallel to said sensing roller such that said pair of deflection arms are also disposed generally transverse to the longitudinal path of the web, said leading and trailing edges thereby establishing a width dimension of said upper and lower surfaces of each said arm as measured in the general direction of movement of said web along said longitudinal path;

a pair of journal support means laterally spaced apart from one another relative to the longitudinal path of the web, each said journal support means fixed to and extending upwardly from a respective one of said upper surfaces of said deflection arms at said unsupported outer ends thereof for journally supporting said sensing roller therebetween and for transferring said reaction force to said pair of deflection arms, said pair of deflection arms each including means for facilitating resilient generally downward flexion of said deflection arms relative to the direction of movement of said web in response to said reaction force being transferred thereto by said journal support means;

said roller support means further including first and second pairs of strain gauges each operatively connected to respective said upper and lower surfaces of said pair of deflection arms to detect the extent of said resilient downward flexion thereof to thus provide a signal representative of the tension of the web.

7. Apparatus as in claim 6 wherein said means for facilitating resilient downward flexion of said pair of deflection arms is established by said leading and trailing edges outwardly diverging from one another between said inner and outer ends thereby providing a region of lesser width near said supported inner ends of each said deflection arm as compared to the width of said unsupported outer end of each said deflection arm.

8. Apparatus as in claim 6 wherein said sensing roller includes a central cylindrical portion and a pair of truncated, conically diverging lateral portions wherein said lateral portions assist in centering the tow over said central portion.

9. Apparatus as in claim 6 further comprising indicator means for accepting said output signal of said strain gauges and for translating said output signal into a human readable form representative of the tension of the filamentary tow.

10. Apparatus as in claim 6 wherein said roller support means includes means for mounting said roller support means for pivotal movements between an operative position, wherein said sensing roller is in contact with said web, and an inoperative position wherein said sensing roller is spaced from said web.

11. Apparatus as in claim 10 wherein said roller support means includes latch means for releasably holding said roller support means in said operative position.

12. Apparatus as in claim 1 or 6 further comprising means for receiving said signal and, in response thereto, for providing a human-readable indication of and/or for controlling the tension of the web.

13. In an apparatus for producing cigarette filters from a tow of crimped, continuous filaments of the type including means for subjecting the tow to longitudinal tension in at least one zone in the path of tow movement, means for releasing the applied longitudinal tension to thereby deregister adjacent crimps of the tow, means for blooming the tow, and means for compacting the tow into a rod-like filter element, the improvement comprising a device to detect longitudinal tension of the tow applied in said at least one zone, said tension detecting device including a sensing roller, and roller support means for supporting said sensing roller generally transverse to a longitudinal path of said tow in said at least one zone such that the tow is in contact with said sensing roller and exerts a reaction force thereagainst which is indicative of the tension of the tow in said at least one zone, said roller support means including:

a center support post;

a bottom support plate which includes, a pair of planar deflection arms each rigidly supported at an inner end thereof by means of said center support post and having an unsupported outer end laterally spaced from said supported inner end thereof relative to the longitudinal path of the web, each said deflection arm, between said inner and outer ends, being defined by (i) opposing leading and trailing edges, relative to the general direction of movement of said web along said longitudinal path, and (ii) opposing planar upper and lower surfaces, said upper and lower surfaces being joined to said leading and trailing edges and extending from said center support post oppositely relative to the upper and lower surfaces of the other said deflection arm yet parallel to said sensing roller such that said pair of deflection arms are also disposed generally transverse to the longitudinal path of the tow, said leading and trailing edges thereby establishing a width dimension of said upper and lower surfaces of each said deflection arm as measured in the general direction of movement of the tow;

a pair of journal support means laterally spaced apart from one another relative to the longitudinal path of the tow, each said journal support means fixed to and extending upwardly from a respective one of said upper surfaces of said deflection arms at said unsupported outer ends thereof for journally supporting said sensing roller therebetween and for transferring said reaction force to said pair of deflection arms, said pair of deflection arms each including means for facilitating resilient generally downward flexion of said deflection arms relative to the direction of movement of said tow in response to said reaction force being transferred thereto by said journal support means;

said roller support means further including means operatively connected to said pair of deflection arms for detecting the extent of said resilient downward flexion thereof to thus provide a signal representative of the tension of the tow.

14. In an apparatus of claim 13 wherein said means for facilitating flexion is established by a region of a reduced width dimension, as measured in the longitudinal direction of the tow, near said inner end of each of said deflection arm as compared to a width dimension of each said deflection arm near said outer end thereof.

15. In an apparatus of claim 14, wherein said region of reduced width dimension is provided by said leading and trailing edges of each said deflection arm outwardly diverging from one another between said inner and outer ends.

16. In an apparatus of claim 13, 14 or 15, the improvement further comprising means for receiving said signal and in response thereto, for providing a human-readable indication of, and/or for controlling, the tension of the tow.

* * * * *